US012234130B2

(12) United States Patent
Vaughn

(10) Patent No.: US 12,234,130 B2
(45) Date of Patent: Feb. 25, 2025

(54) FAIRLEAD WITH INTEGRATED POSITIONING DEVICE

(71) Applicant: Warn Industries, Inc., Clackamas, OR (US)

(72) Inventor: Eric Vaughn, Milwaukie, OR (US)

(73) Assignee: Warn Industries, Inc., Clackamas, OR (US)

( * ) Notice: Subject to any disclaimer, the term of this patent is extended or adjusted under 35 U.S.C. 154(b) by 97 days.

(21) Appl. No.: 17/495,333

(22) Filed: Oct. 6, 2021

(65) Prior Publication Data

US 2022/0112055 A1 Apr. 14, 2022

Related U.S. Application Data

(60) Provisional application No. 63/089,664, filed on Oct. 9, 2020.

(51) Int. Cl.
*B66D 1/38* (2006.01)
*B66D 1/48* (2006.01)
*B66D 1/56* (2006.01)

(52) U.S. Cl.
CPC ............... *B66D 1/38* (2013.01); *B66D 1/485* (2013.01); *B66D 1/56* (2013.01); *B66D 2700/0141* (2013.01); *B66D 2700/0191* (2013.01)

(58) Field of Classification Search
CPC . B66D 1/38; B66D 1/485; B66D 1/56; B66D 1/28; B66D 1/30; B66D 1/12; B66D 1/00; B66D 1/40; B66D 1/36; B66D 1/08; B66D 1/44; B66D 2700/0141; B66D 2700/0191; B66D 2700/0183; B66D 2700/0125; B65H 75/4402; B65H 75/4405
(Continued)

(56) References Cited

U.S. PATENT DOCUMENTS 2,845,229 A * 7/1958 Bliss .................. B65H 54/2866 242/478.2
3,379,393 A * 4/1968 Pilcher ............... B65H 54/2866 74/89.37
(Continued)

FOREIGN PATENT DOCUMENTS

CH 363773 A * 8/1962 ............... B66D 1/36
CN 111285279 A * 6/2020
(Continued)

OTHER PUBLICATIONS

Extended European Search Report for related European Application No. 21201365.0; action dated Feb. 28, 2022; (7 pages).
(Continued)

*Primary Examiner* — Michael R Mansen
*Assistant Examiner* — Henrix Soto
(74) *Attorney, Agent, or Firm* — K&L Gates LLP

(57) ABSTRACT

A positioning system includes a plurality of sensors, a frame, including a plurality of rollers, and a housing. The housing includes at least one guide rod and a driving module. The at least one guide rod is disposed laterally within the housing. The frame is coupled to the at least one guide rod, such that the frame is configured to translate laterally along the at least one guide rod. The driving module is configured to translate the frame along the at least one guide rod, responsive to a signal received from the plurality of sensors.

17 Claims, 4 Drawing Sheets

(58) Field of Classification Search
USPC .......................................................... 254/266
See application file for complete search history.

(56) References Cited

U.S. PATENT DOCUMENTS

| | | | | | |
|---|---|---|---|---|---|
| 4,616,791 | A * | 10/1986 | Harvey | A01G 25/095 242/397.2 |
| 4,695,010 | A * | 9/1987 | Smith | B66D 1/38 242/478.2 |
| 5,364,043 | A * | 11/1994 | Linderoth | B65H 54/2857 242/478.2 |
| 5,551,644 | A * | 9/1996 | Linderoth | B65H 54/286 242/478.2 |
| 5,663,541 | A * | 9/1997 | Mc Gregor, II | H01H 1/20 200/17 R |
| 2008/0258124 | A1* | 10/2008 | Farmer | B66D 1/00 254/323 |
| 2010/0224843 | A1* | 9/2010 | Christensen | B63B 34/67 254/270 |
| 2018/0229983 | A1* | 8/2018 | Isherwood | B66D 1/38 |
| 2020/0207593 | A1* | 7/2020 | Hall | B66D 1/38 |

FOREIGN PATENT DOCUMENTS

| | | | | | |
|---|---|---|---|---|---|
| DE | 3034707 | A1 * | 4/1982 | B65H 54/2872 |
| DE | 3622900 | A1 * | 1/1988 | B66D 1/38 |
| GB | 1393193 | A | 5/1975 | |
| GB | 1567522 | A * | 5/1980 | B66D 1/38 |
| KR | 20170030339 | A * | 3/2017 | |
| NO | 143792 | B * | 1/1981 | |

OTHER PUBLICATIONS

EP 212013635.0 Communication pursuant to Article 94(3) EPC dated Oct. 2, 2023.

* cited by examiner

FAIRLEAD WITH INTEGRATED POSITIONING DEVICE

PRIORITY CLAIM AND CROSS-REFERENCE TO RELATED APPLICATIONS

This application claims priority to, and the benefit of, U.S. Provisional Patent App. No. 63/089,664, filed Oct. 9, 2020, entitled FAIRLEAD WITH INTEGRATED POSITIONING DEVICE, the entire contents of which are incorporated by reference herein and relied upon.

FIELD

The present disclosure relates generally to systems for guiding and controlling retractable ropes, lines, and cables.

BACKGROUND

A fairlead, such as a hawse fairlead or roller fairlead may be used to guide and restrict lateral movement of a rope or cable, as the rope or cable is pulled through the fairlead and wound onto or off of a drum. Specifically, the rope or cable may extend through an opening in the fairlead and lateral movement of the rope or cable is constrained within the opening in the fairlead. Fairleads are typically used with winches, hoists, and other devices where a rope or cable is wound onto or off of a drum. For example, a fairlead may be mounted to a vehicle, in front of a winch, to guide the rope or cable of the winch as it is wound on and off of the winch drum.

As noted above, the fairlead constrains lateral movement of the rope or cable, for example, as it is wound onto the winch drum. As the rope or cable completes multiple revolutions around the winch drum, the rope or cable will “overlap” itself or, alternatively, lay next to itself. How neatly the rope or cable rests on the drum, as it is wound up, is dependent upon the angle of the rope relative to the drum. If this angle, also referred to as a fleet angle, is extreme relative to the winch drum, the rope or cable will not wind flatly and neatly onto the drum. In this sense, a more extreme fleet angle is one where the rope or cable is not perpendicular (or nearly perpendicular) to the winch drum. As can be expected, extreme fleet angles are common in many winch applications. For example, winches are often located on a bumper of a vehicle, and the vehicle may be on unleveled ground. Additionally or alternatively, the rope or cable may be attached to a fixed object, such as a tree, that is not level with or directly in front of the vehicle and winch. These variations in physical positioning affect the fleet angle and, ultimately, result in undesirable winding of the rope or cable.

Improved fairleads and related systems for improving spooling of rope or cable, as it is wound on and off of the winch drum, are therefore needed.

SUMMARY

The positioning systems and related systems disclosed herein improve on current winch technology, by providing an integrated positioning device that can be advantageously used with a winch to control the positioning of the rope or cable on a spool, as the rope or cable is wound on to and off of the spool.

In light of the disclosure, and without limiting the scope of the invention in any way, in a first aspect of the present disclosure, which may be combined with any other aspect listed herein unless specified otherwise, a positioning system includes a plurality of sensors, a frame, including a plurality of rollers, and a housing. The housing includes at least one guide rod and a driving module. The at least one guide rod is disposed laterally within the housing. The frame is coupled to the at least one guide rod, such that the frame is configured to translate laterally along the at least one guide rod. The driving module is configured to translate the frame along the at least one guide rod, responsive to a signal received from the plurality of sensors.

In a second aspect of the present disclosure, which may be combined with any other aspect listed herein unless specified otherwise, the plurality of rollers includes a first set of rollers and a second set of rollers.

In a third aspect of the present disclosure, which may be combined with any other aspect listed herein unless specified otherwise, the first set of rollers is positioned vertically and establish a front-facing surface of the frame. The first set of rollers permit a cable to pass between the first set of rollers.

In a fourth aspect of the present disclosure, which may be combined with any other aspect listed herein unless specified otherwise, the second set of rollers is positioned horizontally, perpendicular and adjacent to the first set of rollers. The second set of rollers permit the cable to pass between the second set of rollers.

In a fifth aspect of the present disclosure, which may be combined with any other aspect listed herein unless specified otherwise, the plurality of sensors are hingedly fixed to the frame and positioned adjacent to the plurality of rollers.

In a sixth aspect of the present disclosure, which may be combined with any other aspect listed herein unless specified otherwise, the plurality of sensors detect a position of a cable passing through the plurality of rollers.

In a seventh aspect of the present disclosure, which may be combined with any other aspect listed herein unless specified otherwise, the position of the cable is associated with an angle of the cable between the plurality of rollers and a winch.

In an eighth aspect of the present disclosure, which may be combined with any other aspect listed herein unless specified otherwise, the housing is one of a metal, metal alloy, metal composite, and a polymer.

In a ninth aspect of the present disclosure, which may be combined with any other aspect listed herein unless specified otherwise, the housing further includes a drive shaft disposed laterally within the housing.

In a tenth aspect of the present disclosure, which may be combined with any other aspect listed herein unless specified otherwise, the driving module is configured to rotate the drive shaft. Responsive to the driving module rotating the drive shaft, the frame translates laterally along the at least one guide rod.

In an eleventh aspect of the present disclosure, which may be combined with any other aspect listed herein unless specified otherwise, the driving module is one of a pneumatic actuator and a hydraulic actuator.

In a twelfth aspect of the present disclosure, which may be combined with any other aspect listed herein unless specified otherwise, responsive to the driving module being actuated, the frame translates laterally along the at least one guide rod.

In a thirteenth aspect of the present disclosure, which may be combined with any other aspect listed herein unless specified otherwise, a positioning system includes a plurality of sensors, a frame, and a housing. The housing includes at least one guide rod, a drive shaft, and a driving module. The at least one guide rod and the drive shaft are disposed laterally within the housing. The frame is coupled to the at least one guide rod, such that the frame is configured to translate laterally along the at least one guide rod. The driving module is configured to translate the frame along the at least one guide rod, responsive to a signal received from the plurality of sensors.

In a fourteenth aspect of the present disclosure, which may be combined with any other aspect listed herein unless specified otherwise, the driving module is configured to rotate the drive shaft. Responsive to the driving module rotating the drive shaft, the frame translates laterally along the at least one guide rod.

In a fifteenth aspect of the present disclosure, which may be combined with any other aspect listed herein unless specified otherwise, the drive shaft is threaded, and wherein a receptacle on the frame is co-threaded with the drive shaft.

In a sixteenth aspect of the present disclosure, which may be combined with any other aspect listed herein unless specified otherwise, the driving module is an electric motor.

In a seventeenth aspect of the present disclosure, which may be combined with any other aspect listed herein unless specified otherwise, the housing is one of a metal, metal alloy, metal composite, and a polymer.

In an eighteenth aspect of the present disclosure, which may be combined with any other aspect listed herein unless specified otherwise, the plurality of sensors are hingedly fixed to the frame and positioned adjacent to the frame.

In a nineteenth aspect of the present disclosure, which may be combined with any other aspect listed herein unless specified otherwise, the plurality of sensors detect a position of a cable passing through the frame.

In a twentieth aspect of the present disclosure, which may be combined with any other aspect listed herein unless specified otherwise, the frame further includes a plurality of rollers.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein. Moreover, it should be noted that the language used in the specification has been selected for readability and instructional purposes, and not to limit the scope of the inventive subject matter.

BRIEF DESCRIPTION OF THE FIGURES

Understanding that figures depict only typical embodiments of the invention and are not to be considered to be limiting the scope of the present disclosure, the present disclosure is described and explained with additional specificity and detail through the use of the accompanying figures. The figures are listed below.

DETAILED DESCRIPTION

Figure 1:
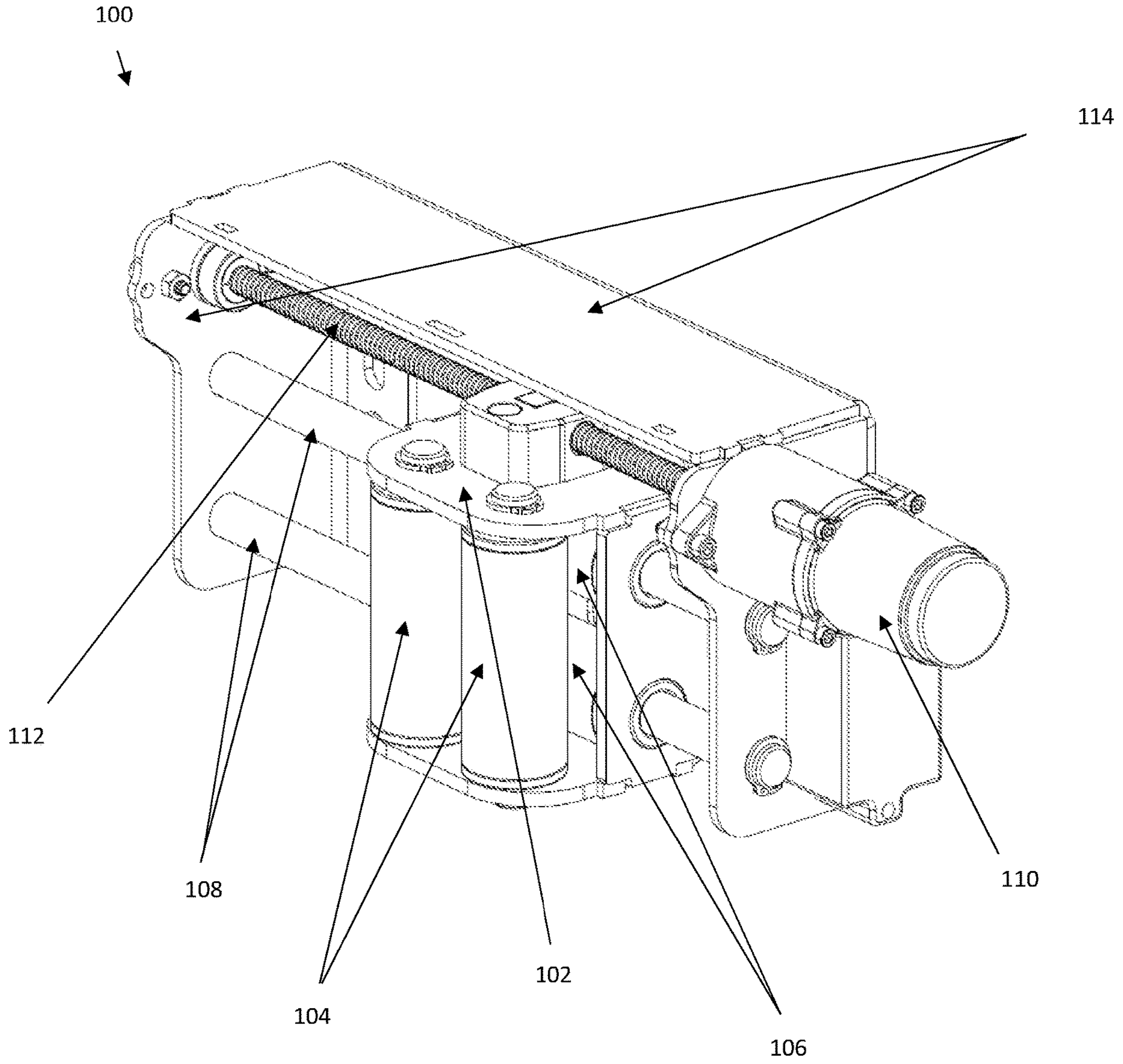
FIG. 1 illustrates a perspective view of an integrated positioning system, according to an example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specific the presence of stated features, integers, steps, operations, elements, and/or components, but do not preclude the presence or additional of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent"). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a positioning system 100 includes a frame 102 and one or more sets of rollers. For example, positioning system 100 includes a first set of rollers 104 and a second set of rollers 106. As illustrated by FIG. 1, the first set of rollers 104 are oriented vertically within frame 102. Similarly, the second set of rollers 106 are oriented horizontally within frame 102. It should be appreciated that, in other embodiments, first set of rollers 104 could be oriented horizontally and second set of rollers 106 could be oriented vertically. Likewise, in other embodiments, positioning system 100 includes fewer, or more, than two sets of rollers.

In an example embodiment, the first set of rollers 104 and second set of rollers 106 may be the same and/or similar size and shape. Further, the first set of rollers 104 and second set of rollers 106, may each include a substantially cylindrical shape and attach to the frame 102 in a manner allowing rolling movement along an axis parallel to the length of each roller. As illustrated, the first set of rollers 104 is positioned vertically relative to the front of the positioning system 100 as to create a front-facing surface of the frame 102, but allow for a rope or cable to pass between the first set of rollers 104. The second set of rollers 106 is positioned horizontally and perpendicular to the first set of rollers 104 immediately adjacent the first set of rollers 104. For example, the first set of rollers 104 and second set of rollers 106 may be positioned in a manner to create an aperture that allows a rope or cable to pass between both the first set of rollers 104 and second set of rollers 106.

In this way, frame 102, along with first set of rollers 104 and second set of rollers 106, can be characterized generally as a roller fairlead (given that a rope or cable passes "through" these roller components). As disclosed herein, positioning system 100 translates this roller fairlead laterally, as controlled by a motor communicating with multiple sensors, to ensure that the rope or cable has the proper fleet angle with a winch drum; this ensures that the rope or cable winds appropriately. Lateral translation of the fairlead is controlled via separate means (e.g., a motor 110, separate and distinct from the winch and winch motor), such that the disclosed positioning system 100 can be implemented with existing winching systems. Furthermore, while the fairlead disclosed in many embodiments herein is a roller fairlead, it should be appreciated that other fairleads are, likewise, contemplated. Namely, in an alternative embodiment, frame 102 does not include first set of rollers 104 nor second set of rollers 106, yet, nonetheless, laterally translates; in this embodiment, frame 102 can be characterized generally as a hawse fairlead (given that a rope or cable passes "through" this component).

Positioning system 100 further includes at least one guide rod 108, a motor 110, and drive shaft 112. Each of the guide rod 108 and drive shaft 112 are disposed within a housing 114 of positioning system 100.

As illustrated in FIG. 1, positioning system 100 includes two guide rods 108, which are disposed laterally within housing 114. Namely, guide rods 108 permit lateral movement of the frame 102, along the length of the guide rod 108 in either horizontal direction; housing 114 constrains this lateral movement of the frame 102 along the guide rods 108. In an embodiment, the second set of rollers 106 are disposed concentrically onto the guide rods 108, such that the second set of rollers 106, likewise, is permitted to move laterally within housing 114. For example, the second set of rollers 106 may be coupled to guide rods 108 via slideable bushings within frame 102.

The housing 114 may be constructed from a polymer, composite polymer, plastic, or the like. Alternatively, the housing 114 may be constructed from a metal, metal alloy, or metal composite such as aluminum. In an embodiment, the entire housing 114 is cast or single-piece injection molded. The housing 114 includes a plurality of apertures along one or more surfaces of housing 114, to allow the housing 114 to be attached to a winch system (as described in greater detail herein).

As previously noted, positioning system 100 further includes the motor 110 and drive shaft 112. In an embodiment, positioning system 100 is driven by an electric motor and a drive screw. Specifically, in this embodiment, the positioning system 100 includes a motor 110, such as a 12-V electric motor, and a drive shaft 112, such as a spiraled lead screw. The motor 110 can be a self-contained electric motor that provides rotational force to drive shaft 112. The drive shaft 112 is connected to the motor and passes horizontally through and communicates with the frame 102. For example, when the drive shaft 112 is a spiraled lead screw with threading, and the frame 102 includes internal co-threading at an aperture of frame 102, such that the frame 102 is threaded onto the spiraled lead screw; thus, rotation of the drive shaft 112 causes lateral translation of the frame 102. In this way, as the motor 110 rotates the drive shaft 112, and rotation of the drive shaft 112 causes the frame 102 to translate laterally along the guide rod 108 within the housing 114. As the frame 102 moves laterally along the guide rod 108, a rope or cable passing through the frame 102 also moves laterally with the frame 102.

In an embodiment, positioning system 100 includes overload protection within the drive shaft 112. For example, overload protection may include one or more of a spilt nut or half nut, a shear pin, or other similar mechanical devices to ensure that excessive forces delivered by motor 110 do not damage other components of positioning system 100, such as the threading of drive shaft 112 and/or frame 102. Similarly, in an embodiment, positioning system 100 includes one or more mechanical disconnects (e.g., to prevent overloading).

While the embodiments above generally relate to a configuration with an electric motor and drive screw, it should be appreciated that other means for mechanically translating frame 102 laterally along guide rod 108 are contemplated herein. For example, in an alternate embodiment, positioning system 100 includes a pneumatic air cylinder that moves frame 102 in the lateral directions (e.g., along guide rod 108). In a different alternate embodiment, positioning system 100 includes a hydraulic cylinder that moves frame 102 in the lateral directions (e.g., along guide rod 108). In another different embodiment, positioning system 100 includes any of a belt-driven system, chain, rack and pinion, linear actuator coupled directly to a fairlead, or other related mechanical and electromechanical components for moving frame 102 in the lateral directions. For example, in an alternate embodiment, a linear actuator such as a pneumatic air cylinder or a hydraulic cylinder is connected directly to a fairlead.

Figure 2:
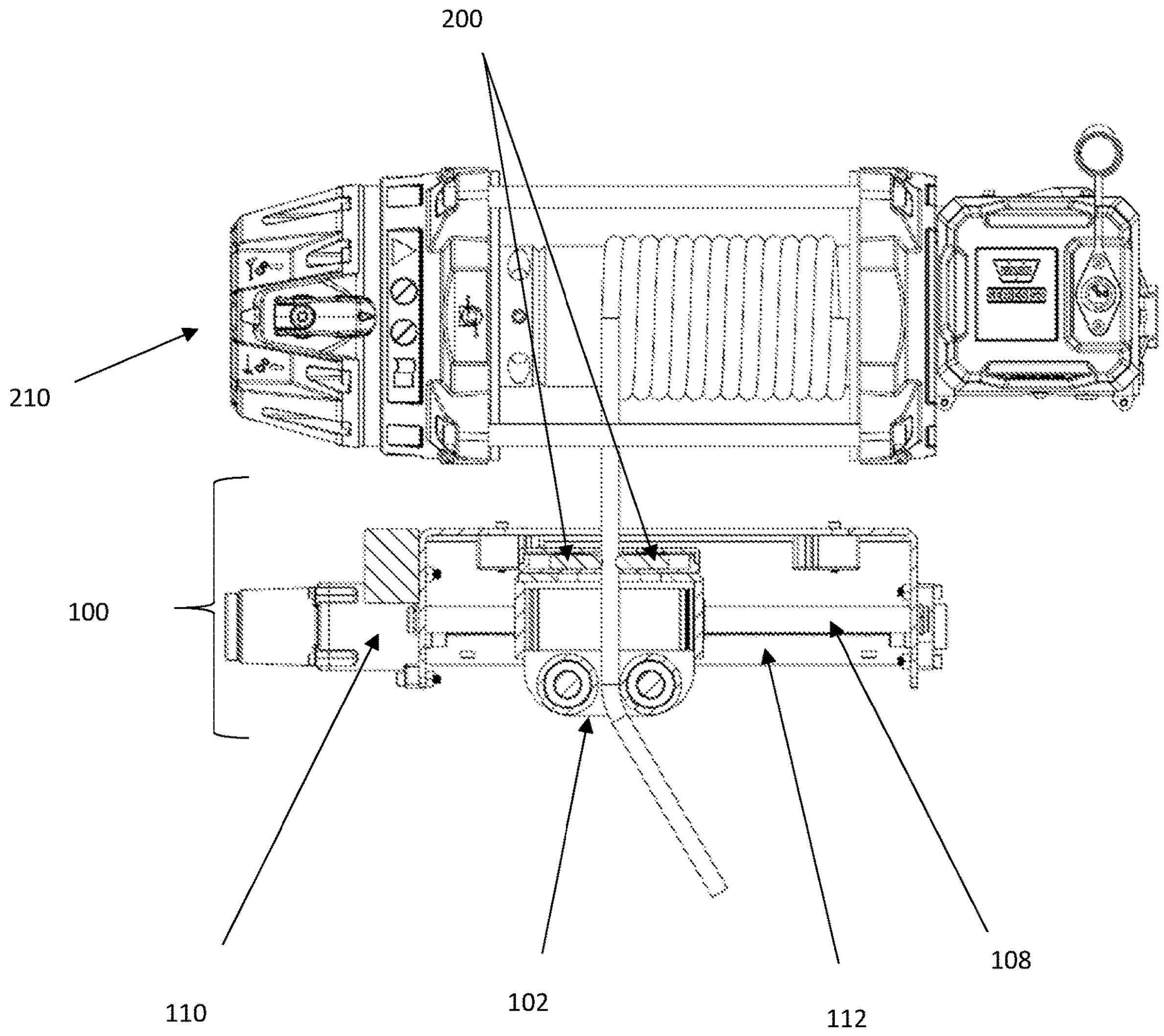
FIG. 2 illustrates a top view of an integrated positioning system along with a winch system, according to an example embodiment of the present disclosure.
Figure 4:
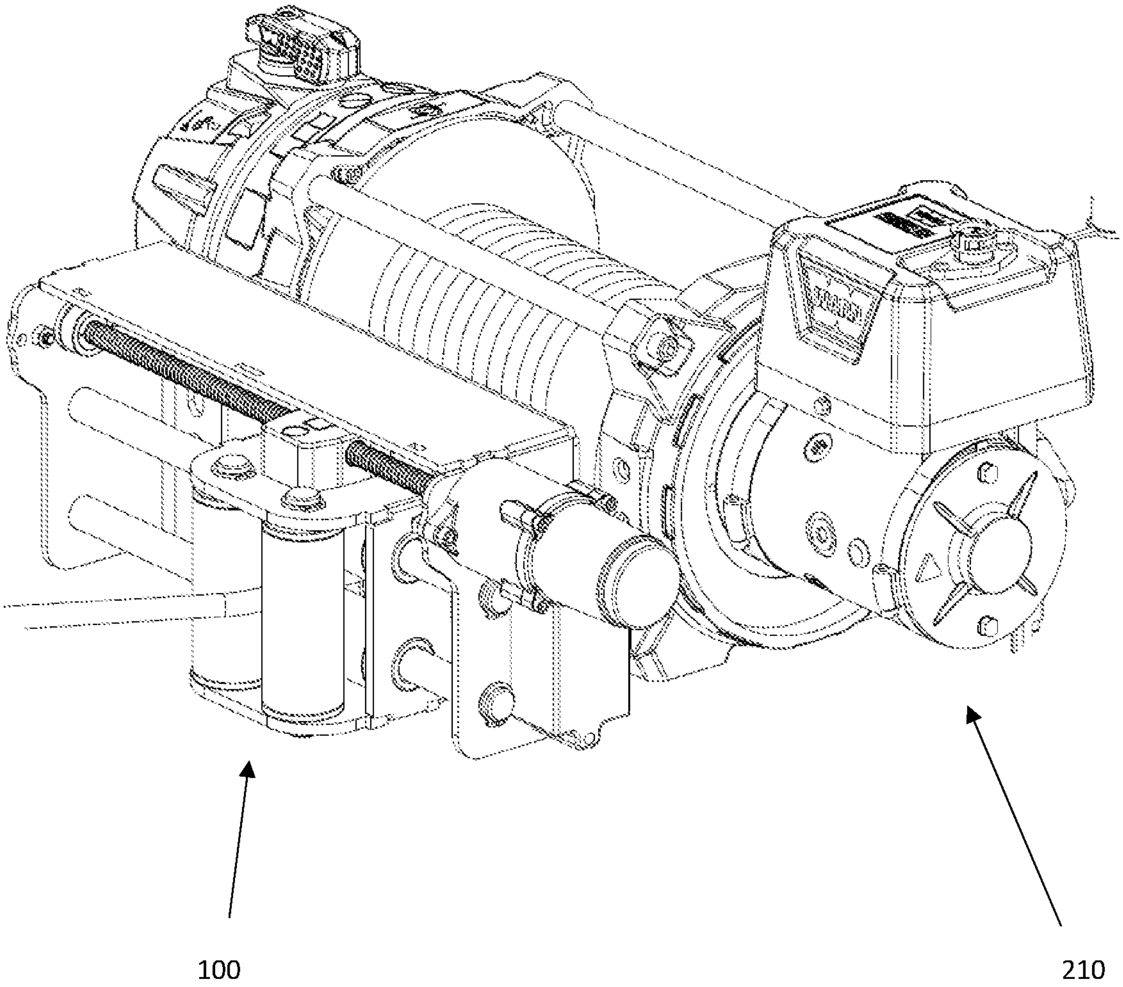
FIG. 4 illustrates a perspective view of an integrated positioning system along with a winch system, according to an example embodiment of the present disclosure.

As illustrated by FIGS. 2 and 4, the positioning system 100 may be disposed adjacent a winch 210 or other winding mechanism. It should be appreciated that, in order to for the winch 210 to coil a rope or cable onto a winch drum, the rope or cable passes through the frame 102 of the positioning system 100. As previously noted, for example, the first set of rollers 104 and second set of rollers 106 may be positioned in a manner to create an aperture that allows a rope or cable to pass between both the first set of rollers 104 and second set of rollers 106. The view illustrated by FIG. 2 is a sectioned view. For example, FIG. 2 illustrates the cross section of the first set of rollers 104 and illustrates one of the rollers from the second set of rollers 106.

Positioning system 100 further includes left and right sensors 200, which may be coupled to the frame 102 in a variety of configurations.

Figure 3:
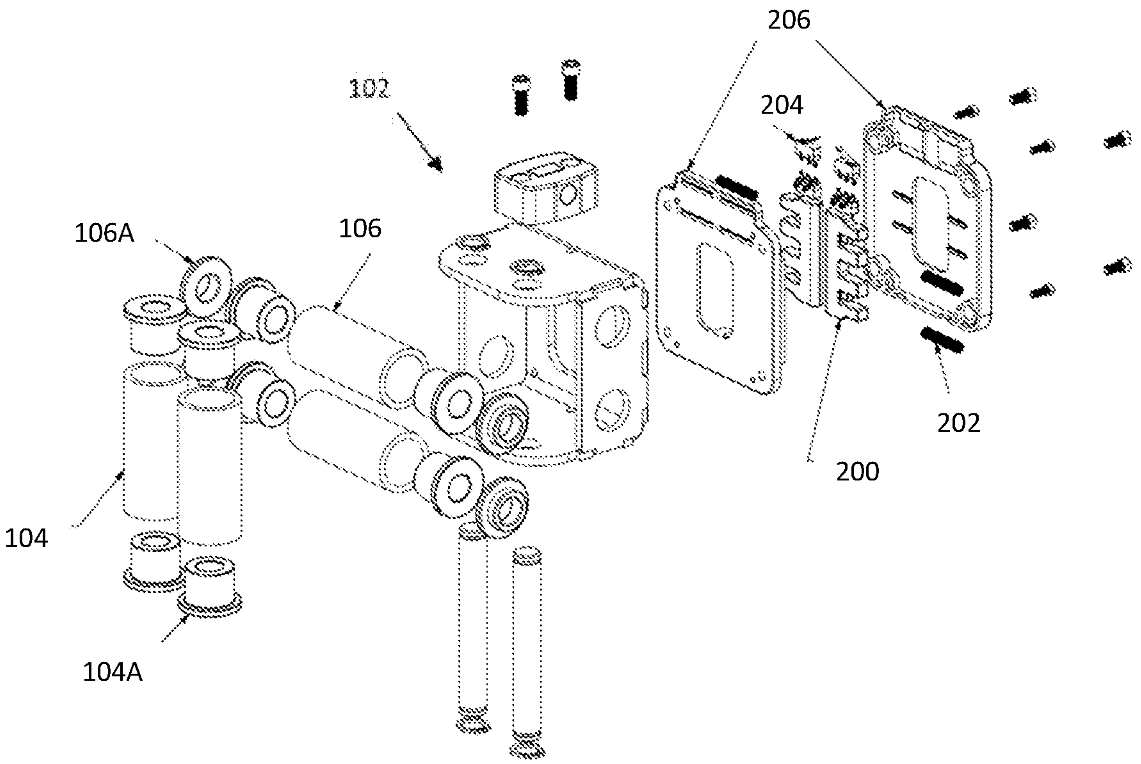
FIG. 3 illustrates an exploded perspective view of an integrated positioning system with sensors, according to an example embodiment of the present disclosure.

As illustrated by FIG. 3, frame 102 includes first set of rollers 104, which are disposed in a vertical configuration. First set of rollers 104 further include bushings 104A and are disposed concentrically around vertical pins. Frame 102 includes second set of rollers 106, which are disposed in a horizontal configuration. Second set of rollers 106 further include bushings 106A. Each of first set of rollers 104 and second set of rollers 106 may be coupled (e.g., via bushings) to a housing. Left and right sensors 200 are generally disposed behind the first set of rollers 104 and second set of rollers 106.

In an embodiment, left and right sensors 200 are disposed in slots within positioning system 100; for example, left and right sensors 200 are spring-biased within slots via springs 202. In this embodiment, left and right sensors 200 may further include micro-switches 204 or other related electro-mechanical sensing components. Left and right sensors 200, along with springs 202, are generally disposed within a guide assembly cover 206. Guide assembly cover 206 includes an aperture, such that a rope or cable may pass through guide assembly cover 206. Each of left and right sensors 200 may be partially disposed within the aperture of guide assembly cover 206.

In a different embodiment, left and right sensors 200 are disposed in a hinged configuration on positioning system 100; for example, left and right sensors 200 are angled and deflect about a hinge on positioning system 100.

Generally, for example, sensors 200 may be biased toward one another (e.g., via a spring or other biasing structure). In this way, sensors 200 are capable of functioning as mechanical proximity sensors to detect the position of the rope or cable, as it passes through the frame 102 toward the winch 210. Namely, the sensors 200 detect the position of the rope or cable via physical deflection of the sensors 200, and communicate sensor readings to the motor 100 (directly or indirectly). Identifying the position of the rope or cable, including its angle relative to the frame 102, allows for dynamic frame-adjustment (e.g., via lateral translation along guide rod 108). In another embodiment, the sensors 200 additionally or alternatively are tactile sensors that detect the physical movement of the rope or cable.

Generally, the sensors 200 communicate with motor 110, and motor 110 subsequently rotates the drive shaft 112 to move the frame 102 laterally along the guide rod 108 (in a particular direction); this ensures that the rope or cable is uniformly wound on to or off of the winch drum. Moving the rope or cable laterally along the winch drum, as the winch 210 is coiling the rope or cable, allows the rope or cable to spool neatly and lie flat on the winch drum, which increases the longevity of the rope or cable. In this way, positioning system 100, via sensors 200 and motor 110, is able to manage the incoming fleet angle of the rope or cable (e.g., as the rope or cable passes the rollers 104, 106) and track the outgoing fleet angle of the rope or cable (e.g., as the rope or cable passes the sensors 200 and tracks onto winch 210).

For example, with reference to FIG. 2, as rope or cable is being wound onto winch drum, subsequent coils of the rope or cable are wrapped along the drum in a left-ward direction (as there are no wraps, to the left of the existing wraps of the rope or cable). As the rope or cable moves in the left-ward direction via subsequent wrappings, the rope or cable becomes angled relative to the frame 102 and winch drum. This angle displaces the left sensor 200 (e.g., within the slot of guide assembly cover 206 or, alternatively, about its hinge). Upon displacement, the angle of the rope or cable relative to the frame 102 and winch drum (measured via sensor-displacement) is communicated to motor 110; motor 110 then translates frame 102 in the left-ward direction (as discussed above), in order to reduce the angle of the rope or cable relative to the frame 102 and winch drum. Once an entire "layer" of wrappings are disposed onto the drum, subsequent wrappings of the rope or cable will be wrapped along the drum in a right-ward direction. As the rope or cable moves in the right-ward direction via subsequent wrappings, the rope or cable becomes angled relative to the frame 102 and winch drum. This angle displaces the right sensor 200 (e.g., within the slot of guide assembly cover 206 or, alternatively, about its hinge). Upon displacement, the angle of the rope or cable relative to the frame 102 and winch drum (measured via sensor-displacement) is communicated to motor 110; motor 110 then translates frame 102 in the right-ward direction (as discussed above), in order to reduce the angle of the rope or cable relative to the frame 102 and winch drum.

It should be appreciated that, in the embodiment illustrated by FIG. 2, positioning system 100 is independent of winch 210. Each of positioning system 100 and winch 210 are controlled via separate systems. In this way, positioning system 100 can advantageously be incorporated onto existing winch systems that are currently in operation. In an embodiment, the control systems for positioning system 100 include user-inputted override controls, rope tensioner calculation and control, over-load breakaway control, and the like.

As discussed briefly above, and in reference to FIGS. 2 and 3, the positioning system 100 may be coupled to a winch 210 or to a vehicle in front of the winch 210, to guide the winch rope or cable during winching operations. That being said, though many of the embodiments above are directed to winches, particularly in front-of-vehicle applications, it should be appreciated that the positioning system 100 may be implanted in any number of other applications where a rope, cable, or line is wound on to and off of a drum, reel or other cylindrical feature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A positioning system, comprising:

a plurality of sensors including a first sensor and a second sensor each disposed within a self-contained guide assembly cover, the self-contained guide assembly cover including a front half and a rear half, wherein each of the front half and the rear half include an aperture configured to receive a cable, the aperture constituting a complete geometric boundary, wherein each of the plurality of sensors is spring-biased within a slot of the self-contained guide assembly cover between the front half and the rear half, and wherein the cable passes through the aperture of the self-contained guide assembly cover between the first sensor and the second sensor;

a frame, including a plurality of rollers, wherein the self-contained guide assembly cover is disposed adjacent to and separate from the plurality of rollers; and a housing, including:

at least one guide rod, and a driving module;

wherein the at least one guide rod is disposed laterally within the housing, wherein the frame is coupled to the at least one guide rod, such that the frame is configured to translate laterally along the at least one guide rod, and wherein the driving module is configured to translate the frame along the at least one guide rod, responsive to a signal received from the plurality of sensors.

2. The positioning system of claim 1, wherein the plurality of rollers includes a first set of rollers and a second set of rollers.

3. The positioning system of claim 2, wherein the first set of rollers is positioned vertically and establish a front-facing surface of the frame, and wherein the first set of rollers is configured to permit the cable to pass between the first set of rollers.

4. The positioning system of claim 3, wherein the second set of rollers is positioned horizontally, perpendicular to and adjacent to the first set of rollers, and wherein the second set of rollers is configured to permit the cable to pass between the second set of rollers.

5. The positioning system of claim 1, wherein the plurality of sensors detect a position of the cable passing through the plurality of rollers.

6. The positioning system of claim 5, wherein the position of the cable is associated with an angle of the cable between the plurality of rollers and a winch.

7. The positioning system of claim 1, wherein the housing is one of a metal, metal alloy, metal composite, or a polymer.

8. The positioning system of claim 1, wherein the housing further includes a drive shaft disposed laterally within the housing.

9. The positioning system of claim 8, wherein the driving module is configured to rotate the drive shaft and, responsive to the driving module rotating the drive shaft, the frame translates laterally along the at least one guide rod.

10. The positioning system of claim 1, wherein the driving module is one of a pneumatic actuator or a hydraulic actuator.

11. The positioning system of claim 10, wherein responsive to the driving module being actuated, the frame translates laterally along the at least one guide rod.

12. A positioning system, comprising:

a plurality of sensors including a first sensor and a second sensor each disposed within a self-contained guide assembly cover, the self-contained guide assembly cover including a front half and a rear half, wherein each of the front half and the rear half include an aperture configured to receive a cable, the aperture constituting a complete geometric boundary, wherein each of the plurality of sensors is spring-biased within a slot of the self-contained guide assembly cover between the front half and the rear half, and wherein the cable passes through the aperture of the self-contained guide assembly cover between the first sensor and the second sensor;

a frame, wherein the self-contained guide assembly cover is disposed adjacent to and separate from a plurality of rollers; and a housing, including:

at least one guide rod, a drive shaft, and a driving module;

wherein the at least one guide rod and the drive shaft are disposed laterally within the housing, wherein the frame is coupled to the at least one guide rod, such that the frame is configured to translate laterally along the at least one guide rod, and wherein the driving module is configured to translate the frame along the at least one guide rod, responsive to a signal received from the plurality of sensors.

13. The positioning system of claim 12, wherein the driving module is configured to rotate the drive shaft and, responsive to the driving module rotating the drive shaft, the frame translates laterally along the at least one guide rod.

14. The positioning system of claim 12, wherein the drive shaft is threaded, and wherein a receptacle on the frame is co-threaded with the drive shaft.

15. The positioning system of claim 12, wherein the driving module is an electric motor.

16. The positioning system of claim 12, wherein the housing is one of a metal, metal alloy, metal composite, or a polymer.

17. The positioning system of claim 12, wherein the plurality of sensors detect a position of the cable passing through the frame.

* * * * *